(12) United States Patent
Lee et al.

(10) Patent No.: US 7,927,747 B2
(45) Date of Patent: Apr. 19, 2011

(54) ADDITIVES FOR NON-AQUEOUS ELECTROLYTE AND LITHIUM SECONDARY BATTERY USING THE SAME

(75) Inventors: Ho Chun Lee, Daejeon (KR); Sun Sik Shin, Daejeon (KR); Hong Kyu Park, Daejeon (KR); Joo Mi Jeon, Seoul (KR); Jeong Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 1128 days.

(21) Appl. No.: 11/623,845

(22) Filed: Jan. 17, 2007

(65) Prior Publication Data

US 2007/0166609 A1    Jul. 19, 2007

(30) Foreign Application Priority Data

Jan. 17, 2006    (KR) .................. 10-2006-0005058

(51) Int. Cl.
*H01M 6/16* (2006.01)
*H01M 6/04* (2006.01)

(52) U.S. Cl. .................. 429/327; 429/326; 429/200

(58) Field of Classification Search .................. 252/62.2
See application file for complete search history.

(56) References Cited

U.S. PATENT DOCUMENTS

| 5,709,968 | A |   | 1/1998 | Shimizu |         |
|-----------|---|---|--------|---------|---------|
| 5,763,119 | A | * | 6/1998 | Adachi  | 429/199 |
| 5,776,627 | A |   | 7/1998 | Mao et al. | |
| 5,879,834 | A |   | 3/1999 | Mao     |         |
| 2003/0190529 | A1 | * | 10/2003 | Kim et al. | 429/307 |
| 2005/0221168 | A1 | * | 10/2005 | Dahn et al. | 429/105 |

FOREIGN PATENT DOCUMENTS

| CN | 1147704 A     | 4/1997  |
| JP | 2001357876 A  | 12/2001 |
| WO | 2007083917 A1 | 7/2007  |

OTHER PUBLICATIONS

International Search Report dated May 4, 2007 for Application No. PCT/KR2007/000276 (All references cited in Search Report are listed above).
Chinese Office Action dated Dec. 18, 2009.

* cited by examiner

*Primary Examiner* — Dah-Wei D Yuan
*Assistant Examiner* — Maria J Laios
(74) *Attorney, Agent, or Firm* — Cantor Colburn LLP

(57) ABSTRACT

Disclosed is an electrolyte for batteries, comprising: (a) an electrolyte salt; (b) an organic solvent; (c) a first compound having an oxidation initiation voltage (vs. $Li/Li^+$) higher than the operating voltage of a cathode; and (d) a second reversible compound having an oxidation initiation voltage higher than the operating voltage of the cathode, but lower than the oxidation initiation voltage of the first compound. Also disclosed is a lithium secondary battery comprising said electrolyte. In the lithium secondary battery, two compounds having different safety improvement actions at a voltage higher than the operating voltage of the cathode are used in combination as electrolyte components. Thus, the safety of the secondary battery in an overcharged state can be ensured, and at the same time, the deterioration of the battery can be prevented from occurring when it is repeatedly cycled, continuously charged and stored at high temperature for a long time.

10 Claims, No Drawings

ADDITIVES FOR NON-AQUEOUS ELECTROLYTE AND LITHIUM SECONDARY BATTERY USING THE SAME

This application claims the benefit of the filing date of Korean Patent Application No. 2006-0005058, filed on Jan. 17, 2006, in the Korean Intellectual Property Office, the disclosure of which is incorporated herein in its entirety by reference.

TECHNICAL FIELD

The present invention relates to a lithium secondary battery having improved overcharge safety and minimized performance deterioration, by using a combination of two compounds as electrolyte components, which exhibit different safety improvement actions at a voltage higher than the operating voltage of a cathode and have controlled oxidation initiation voltages.

BACKGROUND ART

Recently, interests in energy storage technology have been gradually increased. As the use of batteries is enlarged to applications for the storage of energy for portable telephones, camcorders, notebook computers, personal computers and electric vehicles, efforts on the research and development of batteries are increasingly embodied. In this view, the field of electrochemical devices receives the greatest attention, and among them, interests in the development of chargeable/dischargeable secondary batteries are focused. More recently, in the development of such batteries, active studies have been conducted to design a novel electrode and battery, which provide an improved capacity density and specific energy.

Among secondary batteries which are now in use, lithium secondary batteries developed in the early 1990s are in the spotlight due to the advantages of higher drive voltages and far greater energy densities than those of conventional batteries, such as Ni-MH, Ni—Cd and sulfuric acid-lead batteries. However, such lithium secondary batteries have safety problems such as ignition and explosion, which result from the use of a non-aqueous electrolyte, and such problems become more severe with an increase in the capacity density of the batteries.

In the non-aqueous electrolyte secondary batteries, a reduction in the safety of the batteries, which occurs when the batteries are continuously charged, becomes a great problem. One of the causes of the reduction in safety is heat generation resulting from the structural degradation of the battery cathode (positive electrode). The heat generation occurs based on the following principles. Specifically, a cathode active material in the non-aqueous electrolyte battery consists of, for example, lithium-containing metal oxide capable of intercalating and deintercalating lithium and/or lithium ions, and such a cathode active material is changed into a thermodynamically unstable structure as a result of the deintercalation of a large amount of lithium ions when the battery is overcharged. When the temperature of the battery in this overcharged state reaches a critical temperature due to external physical impact, for example, exposure to high temperatures, oxygen will be released from the cathode active material having the unstable structure. The released oxygen will cause an exothermic decomposition reaction with, for example, an electrolyte solvent. Particularly, the exothermic decomposition of the electrolyte will be further accelerated by oxygen released from the cathode, which is the positive electrode. Due to such successive exothermic decomposition reactions, the battery will undergo thermal runaway, leading to ignition and explosion.

In attempts to control the above-described ignition or explosion resulting from temperature rise in the battery, many solutions have been suggested, and one example thereof is a method that uses non-aqueous electrolyte additives. As the non-aqueous electrolyte additives, the following additives are known: additives that use redox shuttle mechanisms, for example, bromodimethoxybenzene; and additives that use polymerization mechanisms, for example, alkylbenzene derivatives, such as cyclohexylbenzene (CHB), and biphenyl (BP).

However, the additive undergoing oxidation-reduction cycling (redox shuttle) has a problem in that it is not effective when the charge current of the battery is high. Also, when biphenyl (BP) is used alone as a non-aqueous electrolyte additive, the deterioration in the performance of the battery will necessarily occur due to an increase in the resistance of the battery. In addition, when an alkylbenzene derivative, such as cyclohexylbenzene (CHB), is used as an electrolyte additive, there are problems in that the additive will deteriorate the performance of the battery, since it is partially consumed by reaction even upon the repeated cycling, continuous charge as well as overcharge of the battery. For this reason, there is a continued need to develop a method for improving the safety of the non-aqueous electrolyte secondary battery.

DISCLOSURE OF THE INVENTION

The present inventors have found that, when the above-described compounds of improving the safety of a battery through different actions upon overcharge of the battery are used in combination after suitably controlling the difference in oxidation initiation voltage therebetween instead of simply using them together, the safety of the battery in an overcharged state can be ensured, and at the same time, the deterioration of the battery can be prevented from occurring when it is repeatedly cycled, continuously charged and stored at high temperature for a long time.

Accordingly, it is an object of the present invention to provide an electrolyte for batteries, comprising the above-described components, and a lithium secondary battery comprising said electrolyte.

To achieve the above object, in one aspect, the present invention provides an electrolyte for batteries, comprising an electrolyte salt and an organic solvent, the electrolyte comprising: (a) a first compound having an oxidation initiation voltage (vs. Li/Li$^+$) higher than the operating voltage of a cathode; and (b) a second reversible compound having an oxidation initiation voltage higher than the operating voltage of the cathode, but lower than the oxidation initiation voltage of the first compound.

In another aspect, the present invention provides a lithium secondary battery comprising said electrolyte. In still another aspect, the present invention provides a method for fabricating a secondary battery having improved overcharge safety, the method comprising using a combination of at least two electrolyte additives having different oxidation initiation voltages (vs. Li/Li$^+$) and oxidation mechanisms, in such a way that the secondary battery comprises an electrolyte containing: (a) a first compound, which has an oxidation initiation voltage (vs. Li/Li$^+$) higher than the operating voltage of a cathode and performs at least one action selected from gas generation, heat generation, and passivation layer formation, at a voltage higher than the operating voltage of the cathode;

and (b) a second reversible compound, which has an oxidation initiation voltage higher than the operating voltage of the cathode, but lower than the oxidation initiation voltage of the first compound, and consumes overcharge current through reversible redox shuttle when it is oxidized.

Hereinafter, the present invention will be described.

The present invention is characterized in that at least two compounds, which improve the safety of a battery through different actions at a voltage higher than the operating voltage of a cathode, are used in combination as electrolyte components.

Among said at least two compounds, the first compound is a compound having an oxidation initiation voltage higher than the operating voltage of a cathode. The first compound is oxidized at a voltage higher than the operating voltage of the cathode to generate heat, and/or generate gas, and/or form a passivation layer on the electrode surface. When the battery is overcharged, these compounds can prevent the ignition and explosion of the battery through action mechanisms, such as CID-reverse and an increase in internal impedance. Herein, the first compound can be oxidized either to perform one action selected from among heat generation, gas generation and passivation layer formation, or to perform a combination of these actions. Particularly, the first compound is oxidized so that it can directly cause gas generation upon heat generation, or can cause the shut-down of a separator due to an increase in battery internal temperature resulting from heat generation, thus indirectly contributing to the improvement in the safety of the battery.

However, the first compound can be partially consumed by reaction even upon the repeated cycling, continuous charge and long-term storage at high temperature of the battery, such that it cannot perform the necessary role thereof when the battery is overcharged. Also, the first compound has a problem in that once when it is oxidized due to overcharge of the battery, it necessarily results in the deterioration in the performance of the battery.

Among said at least two compounds, the second compound is the same as the first compound in that the oxidation initiation voltage thereof is higher than the operating voltage of the cathode, but the second compound is different from the first compound in that it performs actions different from those of the first compound. For example, the second compound consumes overcharge currents through a redox shuttle mechanism, in which the second compound moves between the cathode and the anode while it is oxidized in the cathode and is reduced in the anode. When the second reversible compound is used, it can minimize the deterioration in the performance of the battery even after overcharge of the battery, but it has a problem in that the effect thereof on the prevention of overcharge is not great when the charge current of the battery is high.

For these reasons, the present invention is characterized in that the above-described first and second compounds are used in combination as electrolyte components, but the difference in oxidation initiation voltage (Li/Li$^+$) therebetween and the oxidation mechanisms thereof are suitably controlled instead of simply using them in combination, and thus it is possible not only to improve the safety of the battery upon overcharge of the battery, but also to prevent deterioration in the performance of the battery.

In other words, when the battery is overcharged with a low charge current corresponding to the oxidation voltage range of the second compound, the second compound contained in the electrolyte will be oxidized earlier than the first compound, so that it will be subjected to reversible redox shuttle, thus consuming the overcharge current without deteriorating the performance of the battery. On the other hand, when the battery is overcharged with a high charge current corresponding to the oxidation voltage range of the first compound, the first compound having an oxidation initiation voltage higher than that of the second compound will operate to prevent the ignition and explosion of the battery, resulting from the overcharge of the battery. Accordingly, the lithium secondary battery of the present invention can minimize the reduction in performance of the battery depending on overcharge current, and at the same time, effectively achieve improvement in the safety of the battery.

In addition, when the lithium secondary battery is repeatedly cycled, continuously charged or stored at high temperature for a long time, the second compound contained in the electrolyte will be oxidized earlier than the first compound, so that consumption of the first compound can be prevented, while the reduction in performance of the battery, resulting from the oxidation of the first compound, can be minimized. Also, because the first compound is not lost, it can provide against an overcharge case where a high charge current occurs.

The first compound to be added to the electrolyte of the present invention is a compound which is oxidized at a voltage higher than the operating voltage of the cathode. As the first compound, any compound can be used without limitation as long as it is oxidized in the above-described voltage range to cause gas generation, heat generation, passivation film formation or combinations thereof. The oxidation initiation voltage (vs. Li/Li$^+$) of the first compound is preferably higher than 4.5V, and more preferably 4.6-5.0V.

Non-limiting examples of the first compound include alkylbenzenes, such as toluene (TL), fluorotoluene (FT), t-butyl benzene (BB), di-t-butyl benzene (DBB), t-amyl benzene (AB) and cyclohexyl benzene (CHB), biphenyl (BP), fluorobiphenyl (FBP), anisol-based compounds such as difluoroanisole and mixtures thereof. In addition, compounds that can be oxidized in the above-described voltage range to cause action mechanisms similar to the above mechanisms fall within the scope of the first compound according to the present invention.

The content of the first compound in the electrolyte is not specifically limited, but is preferably 0.1-10 parts by weight based on 100 parts by weight of the electrolyte. If the content of the first compound is less than 0.1 parts by weight, it will have an insignificant effect on the prevention of overcharge, and if it is more than 10 parts by weight, it can cause deterioration in the performance of the battery.

As the second compound to be added to the electrolyte of the present invention, any compound can be used without limitation as long as it has an oxidation initiation voltage higher than the operating voltage of the cathode, but lower than the oxidation initiation voltage of the first compound, and reversibly consumes overcharge current in the above-described voltage range through a redox shuttle mechanism. The oxidation initiation voltage (vs. Li/Li$^+$) of the second compound is preferably in the range of 4.2-4.6V.

The second compound is present without consuming the normal charge current of the battery at the normal operating voltage of the battery, but when the voltage thereof becomes higher than the voltage of the cathode due to overcharge of the battery, it will continuously consume the overcharge current through reversible redox-shuttle mechanisms, in which it will lose electrons in the cathode so as to be oxidized, and then receive from the anode.

Non-limiting examples of the second compound include benzene-based compounds, such as fluorodimethoxybenzene, difluorodimethoxybenzene, bromodimethoxybenzene, dibromodimethoxybenzene, Tetrafluoro dihydrobenzo dioxine (TFBD) and lithium borates ($Li_2B_{12}F_xH_{12-x}$, wherein 0<x<3), and mixtures thereof. In addition, compounds that can be oxidized in the above-described voltage range to cause action mechanisms similar to the above mechanisms fall within the scope of the second compound according to the present invention.

The content of the second compound in the electrolyte is not specifically limited, but is preferably 0.1-10 parts by weight based on 100 parts by weight of the electrolyte. If the content of the second compound is less than 0.1 part by weight, the desired effect thereof will be insignificant, and if it is more than 10 parts by weight, it will have the risk of deteriorating the performance of the battery.

The electrolyte for a battery, to which the two compounds are added, comprises conventional components widely known to one skilled in the art, for example, an electrolyte salt and an organic solvent.

The electrolyte salt that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_3^-$ and combinations thereof. A lithium salt is particularly preferred. Non-limiting examples of the lithium salt include $LiClO_4$, $LiCF_3SO_3$, $LiPF_6$, $LiBF_4$, $LiAsF_6$, $LiN(CF_3SO_2)_2$, and mixtures thereof.

The organic solvents that may be used in the present invention include conventional solvents known to those skilled in the art, such as cyclic carbonates, linear carbonates and/or ester based compounds. Non-limiting examples of the organic solvents include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethyoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or a mixture thereof. Halogen derivatives of the above organic solvents may also be used.

In another aspect, the present invention provides a lithium secondary battery comprising: (a) a cathode; (b) an anode; (c) an electrolyte containing the above-described at least two compounds; and (d) a separator. The lithium secondary battery according to the present invention includes a battery rechargeable by lithium intercalation/deintercalation. Particular examples of the lithium secondary battery include a lithium metal secondary battery, a lithium ion secondary battery, a lithium polymer secondary battery or a lithium ion polymer secondary battery.

The lithium secondary battery according to the present invention may be obtained by using a method generally known to one skilled in the art. For example, an electrode assembly is formed by using a cathode, an anode and a porous separator interposed between both electrodes, and then the electrolyte is injected thereto.

Cathode active materials may include any conventional cathode active materials currently used in a cathode of a conventional secondary battery.

Particular non-limiting examples of the anode active material include: lithium transition metal composite oxides such as lithium manganese composite oxides (e.g. $LiMn_2O_4$), lithium nickel oxides (e.g. $LiNiO_2$), lithium cobalt oxides (e.g. $LiCoO_2$), lithium iron oxides, or other oxides containing other transition metals partially substituting for manganese, nickel and cobalt; chalcogenide (e.g. manganese dioxide, titanium dioxide, molybdenum dioxide, etc.); or the like. Among these examples, $LiCoO_2$, $LiNiO_2$, $LiMnO_2$, $LiMn_2O_4$, $Li(Ni_aCo_bMn_c)O_2$ (wherein 0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (wherein 0≦Y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (wherein 0<Z<2), $LiCOPO_4$, $LiFePO_4$ or a mixture thereof is particularly preferred.

Anode active materials may include any conventional anode active materials currently used in a anode of a conventional secondary battery. Particular non-limiting examples of the anode active materials include carbon, lithium metal or alloys, and other metal oxides capable of lithium intercalation/deintercalation and having a potential less than 2V based on lithium, such as $TiO_2$, $SnO_2$, or the like. Carbonaceous materials are preferred.

Preferably, the separator is a porous separator. Non-limiting examples of the separator that may be used include a polypropylene-based, polyethylene-based or polyolefin-based separator, or a porous separator, into which inorganic particles are incorporated.

There is no particular limitation in the outer shape of the lithium secondary battery obtained in the above-described manner. The electrochemical device may be a cylindrical, prismatic, pouch-type or coin-type device.

In another aspect, the present invention provides a method for fabricating a secondary battery having improved overcharge stability, the method comprising using a combination of at least two electrolyte additives having different oxidation initiation voltages (vs. $Li/Li^+$) and oxidation mechanisms, in such a way that the secondary battery comprises an electrolyte containing: (a) a first compound, which has a oxidation initiation voltage (vs. $Li/Li^+$) higher than the operating voltage of a cathode and performs at least one action selected from gas generation, heat generation, and passivation layer formation, at a voltage higher than the operating voltage of the cathode; and (b) a second reversible compound, which has an oxidation initiation voltage higher than the operating voltage of the cathode, but lower than the oxidation initiation voltage of the first compound, and consumes overcharge current through reversible redox shuttle when it is oxidized. The construction and effect of the battery are the same as described above, and thus will be omitted herein.

BEST MODE FOR CARRYING OUT THE INVENTION

Reference will now be made in detail to the preferred embodiments of the present invention. It is to be understood that the following examples are illustrative only and the present invention is not limited thereto.

EXAMPLES 1-4

Example 1

Manufacture of Lithium Secondary Battery $LiCoO_2$ was used as a cathode active material, and a conductive agent and a binder were added to NMP (N-methyl-2-pyrrolidone) along with the cathode active material to form cathode slurry. Then, the cathode slurry was coated onto an aluminum (Al) collector to provide a cathode.

As anode active material, artificial graphite was used, and a binder was added to NMP along with the anode active material to form the anode slurry. Then, the anode slurry was coated onto a copper (Cu) collector to provide an anode.

As an electrolyte, EC/EMC-based solution (EC:EMC=1:2) containing 1M $LiPF_6$ dissolved therein was used. And butylbenzene (BB) as a first compound and dibromomethoxybenzene (DBDMB) as a second compound were added to the electrolyte in an amount of 5.0 parts by weight and 2.0 parts by weight, respectively (see Table 1).

A polyolefin-based separator was interposed between the cathode and the anode obtained as described above to form an electrode assembly, and the electrolyte was injected thereto to provide a pouch type battery.

Example 2

A lithium secondary battery was fabricated in the same manner as in Example 1, except that cyclohexyl benzene (CHB) as the first compound and dibromomethoxybenzene (DBDMB) as the second compound were added to the electrolyte in an amount of 3.0 parts by weight and 2.0 parts by weight, respectively, instead of using butylbenzene (BB) and dibromomethoxybenzene (DBDMB) (See Table 1).

Example 3

A lithium secondary battery was fabricated in the same manner as in Example 1, except that biphenyl (BP) as the first compound and dibromomethoxybenzene (DBDMB) as the second compound were added to the electrolyte in an amount of 3.0 parts by weight and 2.0 parts by weight, respectively, instead of using butylbenzene (BB) and dibromomethoxybenzene (DBDMB) (See Table 1).

Example 4

A lithium secondary battery was fabricated in the same manner as in Example 1, except that cyclohexyl benzene (CHB) as the first compound and lithium dodecafluorododecaborate (LDFDB) as the second compound were added to the electrolyte in an amount of 3.0 parts by weight and 2.0 parts by weight, respectively, instead of using butylbenzene (BB) and dibromomethoxybenzene (DBDMB) (See Table 1).

COMPARATIVE EXAMPLES 1-6

Comparative Example 1

A lithium secondary battery was fabricated in the same manner as in Example 1, except that only BB as the first compound was added to the electrolyte in an amount of 5.0 parts by weight, instead of using butylbenzene (BB) and dibromomethoxybenzene (DBDMB) (See Table 1).

Comparative Example 2

A lithium secondary battery was fabricated in the same manner as in Example 1, except that CHB as the first compound was added to the electrolyte in an amount of 5.0 parts by weight, instead of using butylbenzene (BB) and dibromomethoxybenzene (DBDMB) (See Table 1).

Comparative Example 3

A lithium secondary battery was fabricated in the same manner as in Example 1, except that BP as the first compound was added to the electrolyte in an amount of 5.0 parts by weight, instead of using butylbenzene (BB) and dibromomethoxybenzene (DBDMB) (See Table 1).

Comparative Example 4

A lithium secondary battery was fabricated in the same manner as in Example 1, except that only DBDMB as the second compound was added to the electrolyte in an amount of 2.0 parts by weight, instead of using butylbenzene (BB) and dibromomethoxybenzene (DBDMB) (See Table 1).

Comparative Example 5

A lithium secondary battery was fabricated in the same manner as in Example 1, except that LDFDB as the second compound was added to the electrolyte in an amount of 2.0 parts by weight, instead of using butylbenzene (BB) and dibromomethoxybenzene (DBDMB) (See Table 1).

Comparative Example 6

A lithium secondary battery was fabricated in the same manner as in Example 1, except that BP as the first compound and LDFDB as the second compound were added to the electrolyte in an amount of 3.0 parts by weight and 2.0 parts by weight, respectively, instead of using butylbenzene (BB) and dibromomethoxybenzene (DBDMB) (See Table 1).

TABLE 1

| Compound category | Compound name | Oxidation initiation voltage (V vs. $Li/Li^+$) |
|---|---|---|
| First compound | Toluene (TL) | 4.8 |
| | 4-fuloro toluene (FT) | 4.9 |
| | t-butyl benzene (BB) | 4.9 |
| | di-t-butyl benzene (DBB) | 4.8 |
| | t-amyl benzene (AB) | 4.9 |
| | cyclohexyl benzene (CHB) | 4.8 |
| | Biphenyl (BP) | 4.6 |
| | 2-fluorobiphenyl (FBP) | 4.7 |
| | 2,4-difluoroanisole (DFA) | 4.6 |
| Second compound | Difluoro dimethoxy bezene (DFDMB) | 4.3 |
| | Bromo dimethoxy bezene (BDMB) | 4.2 |
| | Dibromo dimethoxy bezene (DBDMB) | 4.25 |
| | Tetrafluoro dihydrobenzo dioxine (TFBD) | 4.6 |
| | Lithium nonanfluoro dodecaborate (LNFDB) | 4.4 |
| | Lithium dodecafluoro dodecaborate (LDFDB) | 4.6 |

Experimental Example 1

Assessment of Performance of Lithium Secondary Batteries

To assess the performance of the lithium secondary batteries fabricated according to the present invention, the following tests were carried out.

In the tests, the following lithium secondary batteries were used: the lithium secondary batteries of Examples 1-4, in which at least two compounds having different oxidation initiation voltages and oxidation mechanisms in a voltage region higher than the operating voltage of the cathode were used in combination as electrolyte components. As control groups, the following batteries were used: the batteries of Comparative Examples 1 to 5, where one of the two compounds was used alone; and the battery of Comparative Example 6, where the two compounds were used in combination, but the difference in oxidation initiation voltage therebetween was not controlled.

Just before conducting the tests, each of the batteries was charged at 0.1 C at room temperature, stored for 3 days at room temperature, and then charged and discharged three times at 0.2 C.

1-1: Assessment of Cycle Life Characteristics

Each of the batteries was charged and discharged 150 times at 0.5 C at 45° C., and the ratio of 150-cycle discharge capacity relative to the first-cycle discharge capacity is shown in Table 2 below.

As can be seen in Table 2, in the batteries of Comparative Examples 1 to 3, in which the first compound was used alone, and the battery of Comparative Example 6, in which the first compound and the second compound were used in combination, but the oxidation initiation voltages of the two compounds were similar to each other, it could be observed that the capacity maintenance rates of the batteries were significantly reduced. This suggests that the oxidation of the first compound occurred due to overcharge, resulting in the reduction in performance of the batteries.

On the other hand, in the cases of the batteries of Examples 1 to 4, in which the first compound and the second compound, having different oxidation initiation voltages, were used in combination, and the batteries of Comparative Examples 4 and 5, in which only the second compound was used as the electrolyte additive, the batteries had high capacitance maintenance rates (see Table 2).

1-2: Assessment of Continuous Charge Characteristics

Each of the batteries was applied with a constant voltage of 4.2V at 45 ° C. for 24 hours, and an increase in the thickness thereof was measured. The measurement results are shown in Table 2.

As can be seen in Table 2, in the cases of the batteries of Comparative Examples 1-3, in which the first compound was used alone, and the battery of Comparative Example 6, in which the first compound and the second compound were used in combination, but the oxidation initiation voltages of the two compounds were similar to each other, it could be observed that a significant increase in the thickness of the batteries occurred.

On the other hand, in the cases of the batteries of Examples 1 to 4, in which the first compound and the second compound, having different oxidation initiation voltages, were used in combination, and the batteries of Comparative Examples 4 and 5, in which only the second compound was used, it could be observed that a change in the thickness of the batteries was insignificant (see Table 2).

Experimental Example 2

Assessment of Safety of Lithium Secondary Batteries

To assess the safety of the lithium secondary batteries fabricated according to the present invention, the following tests were carried out.

In the tests, the following batteries were used: the lithium secondary batteries of Examples 1-4, in which at least two compounds having different oxidation initiation voltages and oxidation mechanisms at a voltage higher than the operating voltage of the cathode were used in combination as electrolyte components. As control groups, the following batteries were used: the batteries of Comparative Examples 1 to 5, where one of the two compounds was used alone; and the battery of Comparative Example 6, where the two compounds were used in combination, but the difference in oxidation initiation voltage therebetween was not controlled.

Just before conducting the tests, each of the batteries was charged at 0.1 C at room temperature, stored for 3 days at room temperature, and then charged and discharged three times at 0.2 C.

2-1: Assessment of High-Temperature Storage Characteristics

Each of the batteries was stored at 60 ° C. for 5 days in a fully charged condition, and then an increase in the thickness thereof was measured. The measurement results are shown in Table 2 below.

As can be seen in Table 2, in the batteries of Comparative Examples 1-3, in which the first compound was used alone, and the battery of Comparative Example 6, in which the first compound and the second compound were used in combination, but the oxidation initiation voltages of the two compounds were similar to each other, a significant increase in the thickness of the batteries occurred. On the other hand, in the batteries of Examples 1-4, in which the first compound and the second compound, having controlled oxidation initiation voltages, were used in combination, and the batteries of Comparative Examples 4 and 5, in which only the second compound was used, a change in the thickness of the batteries was insignificant (see Table 2).

2-2: Assessment of Overcharge Safety

Each of the batteries was overcharged in conditions of 2 C-12V, while the surface temperature thereof, and whether ignition/explosion occurred, were observed.

In the test results, in the batteries of Comparative Examples 4 and 5, in which only the second compound was used, ignition/explosion of the batteries occurred with a rapid increase in the surface temperature thereof. This suggests that the use of the second compound cannot prevent overcharge from occurring due to high charge current.

On the other hand, in the batteries of Examples 1-4, the batteries of Comparative Examples 1-3, and the battery of Comparative Example 6, in which the first compound was used regardless of the use of the second compound, it could be observed that an increase in the surface temperature thereof was insignificant, and no ignition/explosion of the batteries occurred (see Table 2).

TABLE 2

| | First compound | Second compound | Ratio of 150-cycle discharge capacity relative to first-discharge capacity at 45° C. (%) | Increase in thickness after continuous charge at 45° for 24 hrs to 4.2 V (mm) | Increase in thickness after storage at 60° C. for 5 days (mm) | Overcharge test | |
|---|---|---|---|---|---|---|---|
| | | | | | | Max. temperature (° C.) | Ignition/ explosion |
| Example 1 | BB | DBDMB | 91 | 0.03 | 0.14 | 107° C. | X |
| Example 2 | CHB | DBDMB | 89 | 0.08 | 0.27 | 91° C. | X |
| Example 3 | BP | DBDMB | 83 | 0.13 | 0.36 | 113° C. | X |
| Example 4 | CHB | LDFDB | 92 | 0.05 | 0.51 | 92° C. | X |
| Comparative Example 1 | BB | — | 76 | 0.65 | 1.41 | 115° C. | X |
| Comparative Example 2 | CHB | — | 71 | 0.88 | 1.54 | 93° C. | X |
| Comparative Example 3 | BP | — | 54 | 1.48 | 2.25 | 145° C. | X |
| Comparative Example 4 | — | DBDMB | 92 | 0.03 | 0.13 | >200° C. | ○ |
| Comparative Example 5 | — | LDFDB | 94 | 0.02 | 0.18 | >200° C. | ○ |
| Comparative Example 6 | BP | LDFDB | 60 | 1.24 | 2.18 | 115° C. | X |

As a result, it could be found that, according to the present invention, the deterioration in performance of batteries according to overcharge current can be minimized, and at the same time, the safety of the battery can be effectively ensured, by using at least two electrolyte additives, which improve the safety of the battery through different oxidation mechanisms at a voltage higher than the operating voltage of the cathode and have suitably controlled oxidation initiation voltages.

INDUSTRIAL APPLICABILITY

As can be seen from the foregoing, the lithium secondary battery employs a combination of at least two electrolyte additives having different oxidation initiation voltages and oxidation mechanisms. Thus, the deterioration in performance of the battery can be minimized, and at the same time, the safety of the battery in an overcharged state can be ensured.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. An electrolyte for batteries, comprising an electrolyte salt and an organic solvent, the electrolyte comprising:
   (a) a first compound having an oxidation initiation voltage (vs. Li/Li$^+$) higher than the operating voltage of a cathode; and
   (b) a second reversible compound having an oxidation initiation voltage higher than the operating voltage of the cathode, but lower than the oxidation initiation voltage of the first compound,
   wherein the first compound is selected from the group consisting of fluorotoluene, t-butyl benzene, di-t-butyl benzene, t-amyl benzene, cyclohexyl benzene, biphenyl, and fluorobiphenyl,
   the second reversible compound is selected from the group consisting of tetrafluoro dihydrobenzo dioxine, and lithium borates according to the formula $Li_2B_{12}F_xH_{12-x}$, wherein $0 \leq x \leq 3$, and
   the first compound and the second reversible compound are used in an amount of 0.1-10 parts by weight, based on 100 parts by weight of the electrolyte, respectively.

2. The electrolyte of claim 1, wherein the oxidation initiation voltage (vs. Li/Li$^+$) of the first compound is in a range of 4.6-5.0 V, and the oxidation initiation voltage (vs. Li/Li$^+$) of the second compound is in a range of 4.2-4.6 V.

3. The electrolyte of claim 1, wherein the first compound performs at least one action selected from the group consisting of heat generation, gas generation and passivation layer formation, at a voltage higher than the operating voltage of the cathode.

4. The electrolyte of claim 1, wherein the second compound consumes overcharge current through redox shuttle at a voltage higher than the operating voltage of the cathode, but lower than the oxidation initiation voltage of the first compound.

5. A lithium secondary battery comprising:
   (a) a cathode;
   (b) an anode;
   (c) an electrolyte as defined in claim 1; and
   (d) a separator, wherein the electrolyte comprises (i) an electrolyte salt, (ii) an organic solvent, (iii) a first compound having an oxidation initiation voltage (vs. Li/Li$^+$) higher than the operating voltage of a cathode; and (iv) a second reversible compound having an oxidation initiation voltage higher than the operating voltage of the cathode, but lower than the oxidation initiation voltage of the first compound,
   wherein the first compound is selected from the group consisting of fluorotoluene, t-butyl benzene, di-t-butyl benzene, t-amyl benzene, cyclohexyl benzene, biphenyl, and fluorobiphenyl,
   the second reversible compound is selected from the group consisting of tetrafluoro dihydrobenzo dioxine, and lithium borates according to the formula $Li_2B_{12}F_xH_{12-x}$, wherein $0 \leq x \leq 3$, and
   the first compound and the second reversible compound are used in an amount of 0.1-10 parts by weight, based on 100 parts by weight of the electrolyte, respectively.

6. The lithium secondary battery of claim 5, wherein the oxidation initiation voltage (vs. Li/Li$^+$) of the first compound is in a range of 4.6-5.0 V, and the oxidation initiation voltage (vs. Li/Li$^+$) of the second compound is in a range of 4.2-4.6 V.

7. The lithium secondary battery of claim 5, wherein the first compound performs at least one action selected from the group consisting of heat generation, gas generation and passivation layer formation, at a voltage higher than the operating voltage of the cathode.

8. The lithium secondary battery of claim 5, wherein the second compound consumes overcharge current through redox shuttle at a voltage higher than the operating voltage of the cathode, but lower than the oxidation initiation voltage of the first compound.

9. A method for fabricating a secondary battery having improved overcharge safety, the method comprising using a combination of at least two electrolyte additives having different oxidation initiation voltages (vs. Li/Li$^+$) and oxidation mechanisms, in such a way that the secondary battery comprises an electrolyte containing:

(a) a first compound, which has a oxidation initiation voltage (vs. Li/Li$^+$) higher than the operating voltage of a cathode and performs at least one action selected from gas generation, heat generation, and passivation layer formation, at a voltage higher than the operating voltage of the cathode; and (b) a second reversible compound, which has an oxidation initiation voltage higher than the operating voltage of the cathode, but lower than the oxidation initiation voltage of the first compound, and consumes overcharge current through reversible redox shuttle when it is oxidized, wherein the first compound is selected from the group consisting of fluorotoluene, t-butyl benzene, di-t-butyl benzene, t-amyl benzene, cyclohexyl benzene, biphenyl, and fluorobiphenyl, the second reversible compound is selected from the group consisting of tetrafluoro dihydrobenzo dioxine, and lithium borates according to the formula $Li_2B_{12}F_xH_{12-x}$, wherein $0 \leq x \leq 3$, and the first compound and the second reversible compound are used in an amount of 0.1-10 parts by weight, based on 100 parts by weight of the electrolyte, respectively.

10. The method of claim 9, wherein the oxidation initiation voltage (vs. Li/Li$^+$) of the first compound is in a range of 4.6-5.0 V, and the oxidation initiation voltage (vs. Li/Li$^+$) of the second compound is in a range of 4.2-4.6 V.

\* \* \* \* \*